(12) United States Patent
Wang

(10) Patent No.: US 11,106,122 B2
(45) Date of Patent: Aug. 31, 2021

(54) PROJECTING DEVICE

(71) Applicant: Chih-Huang Wang, Taoyuan (TW)

(72) Inventor: Chih-Huang Wang, Taoyuan (TW)

( * ) Notice: Subject to any disclaimer, the term of this patent is extended or adjusted under 35 U.S.C. 154(b) by 0 days.

(21) Appl. No.: 16/887,400

(22) Filed: May 29, 2020

(65) Prior Publication Data

US 2020/0393749 A1 Dec. 17, 2020

(30) Foreign Application Priority Data

Jun. 11, 2019 (TW) ................................ 108120113

(51) Int. Cl.
*G03B 21/28* (2006.01)
*G02B 13/18* (2006.01)
*G02B 13/16* (2006.01)

(52) U.S. Cl.
CPC ............. *G03B 21/28* (2013.01); *G02B 13/16* (2013.01); *G02B 13/18* (2013.01)

(58) Field of Classification Search
CPC .... G03B 21/008; G03B 21/28; G03B 21/145; G03B 21/208; G03B 21/2066; G02B 27/0172; G02B 27/18; G02B 27/30; G02B 27/0955; G02B 27/0966; G02B 27/0977; G02B 13/02; G02B 13/06; G02B 13/16; G02B 13/18; G02B 13/0045; G02B 13/0065
See application file for complete search history.

(56) References Cited

U.S. PATENT DOCUMENTS

| | | | | |
|---|---|---|---|---|
| 7,170,687 B2* | 1/2007 | Kobayashi | ............ | G02B 13/04 359/651 |
| 2001/0050758 A1* | 12/2001 | Suzuki | .................. | G02B 13/16 353/69 |
| 2015/0185452 A1* | 7/2015 | Hsu | ......................... | G02B 9/64 359/728 |
| 2015/0346469 A1* | 12/2015 | Lin | ....................... | G02B 13/16 353/98 |
| 2019/0331999 A1* | 10/2019 | Lee | ..................... | G03B 21/008 |

* cited by examiner

*Primary Examiner* — Sultan Chowdhury
(74) *Attorney, Agent, or Firm* — Birch, Stewart, Kolasch & Birch, LLP

(57) ABSTRACT

A projecting device includes an intermediate optical system arranged along an optical axis and a reflective optical system including a reflecting component and at least one lens. The at least one lens having a first and a second optical surfaces which are opposite is between the reflecting component and the intermediate optical system; the second optical surface faces the intermediate optical system. After piercing the intermediate optical system, the image beam enters the at least one lens through the second optical surface, and enters a reflecting surface of the reflecting component through the first optical surface; after reflected by the reflecting surface, the image beam pierces the at least one lens, leaves the at least one lens from the second optical surface, and is projected toward the imaging plane. The effective diameters of the reflecting component and the at least one lens are on one side of the optical axis.

12 Claims, 5 Drawing Sheets

PROJECTING DEVICE

BACKGROUND OF THE INVENTION

1. Technical Field

The present invention relates generally to projection, and more particularly to a projecting device.

2. Description of Related Art

With the advancement of video technology, projection equipment suitable for general family spaces and work meetings is becoming more popular. In projection equipment, a projecting lens for clearly displaying the image on a screen is an important core component.

Furthermore, with the progress in technology, for adapting to limited spaces, some manufacturers produce short-focus projecting equipment which can achieve the effect of clear projection in a limited space. Said short-focus projecting equipment usually includes a large number of lenses to achieve short-focus as well as have high optical performance. However, a large number of lenses will make the weight and volume of the short-focus projecting lens unable to be reduced, which thus cannot meet the general needs of portability and light weight.

Therefore, the short-focus projecting lens having high optical performance also needs to have reduced size and weight, so that the short-focus projecting equipment can meet the common needs of light weight and portability.

BRIEF SUMMARY OF THE INVENTION

In view of the above, the primary objective of the present invention is to provide a projecting device whose volume is effectively reduced with high optical performance.

The present invention provides a projecting device for receiving an image beam generated by an image light source generating device and then projecting the image beam toward a direction of an imaging plane, wherein the projecting device includes an intermediate optical system arranged along an optical axis and a reflective optical system; the intermediate optical system is provided to receive the image beam and for the image beam P to pass; the reflective optical system includes a reflecting component and at least one lens, wherein the at least one lens is located between the reflecting component and the intermediate optical system, and has a first optical surface and a second optical surface, which are opposite to each other; the second optical surface faces the intermediate optical system;

wherein, after the image beam passing through the intermediate optical system, the image beam enters the at least one lens through the second optical surface, and enters a reflecting surface of the reflecting component through the first optical surface; then, after being reflected by the reflecting surface, the image beam passes through the at least one lens, and leaves the at least one lens from the second optical surface, and is finally projected toward the direction of the imaging plane;

wherein, in a direction parallel to the optical axis, a distance from the reflecting component to the at least one lens on the optical axis is less than a distance from the at least one lens to the intermediate optical system on the optical axis; the distance from the reflecting component to the at least one lens on the optical axis is greater than or equal to 0;

wherein, an extended surface of the optical axis is divided into a first portion and a second portion; the image beam enters the reflective optical system through the first portion, and after the image beam leaves the at least one lens from the second optical surface, the image beam is projected toward the direction of the imaging plane through the second portion; in addition, effective diameters of the intermediate optical system are located in the first portion and the second portion at the same time, while effective diameters of the reflecting component and the at least one lens are located in the first portion rather than extending to the second portion.

With the abovementioned design, the projecting device can be effectively miniaturized with high optical performance.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
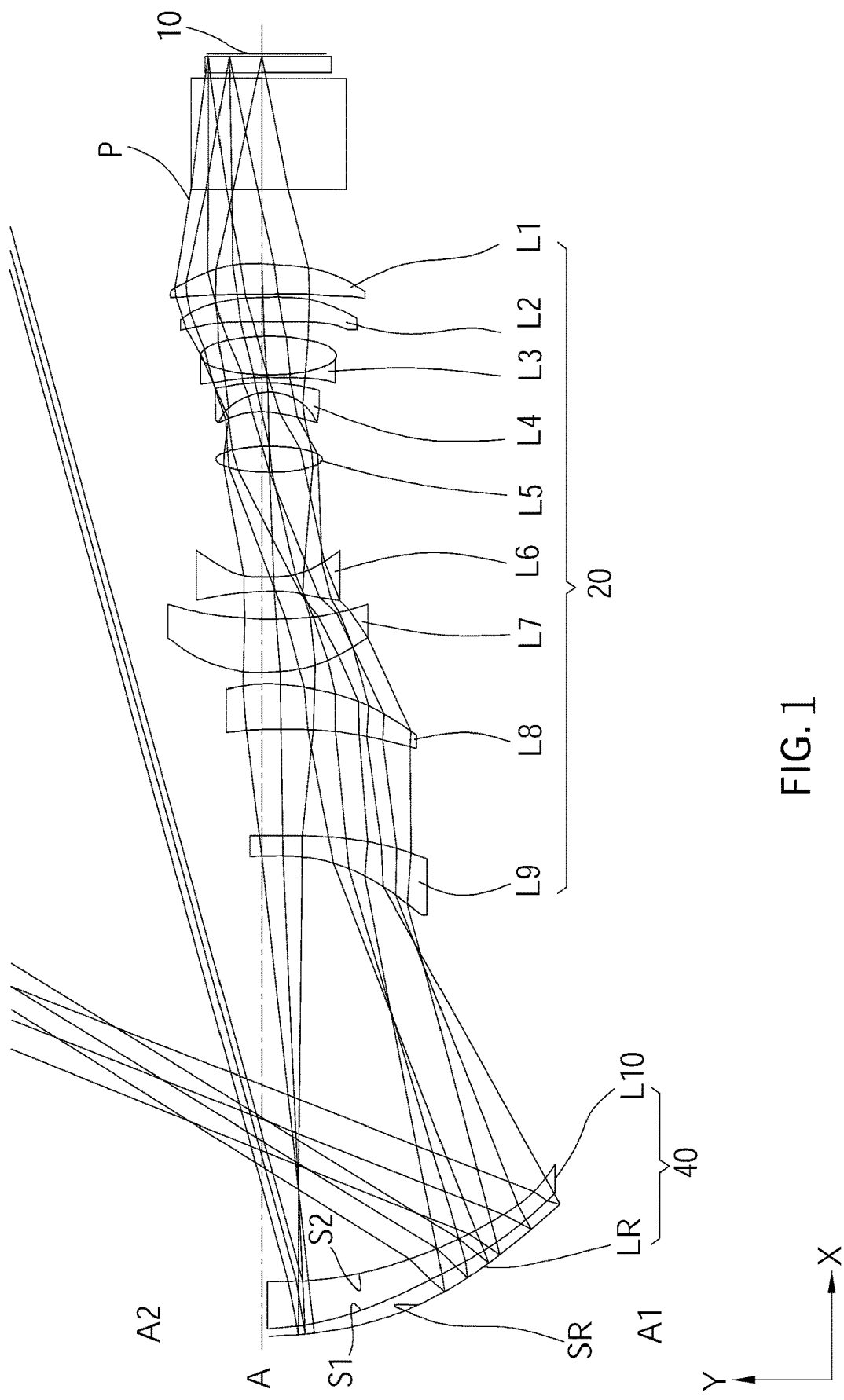
FIG. 1 is a schematic diagram of the projecting device of the first embodiment of the present invention.
Figure 2:
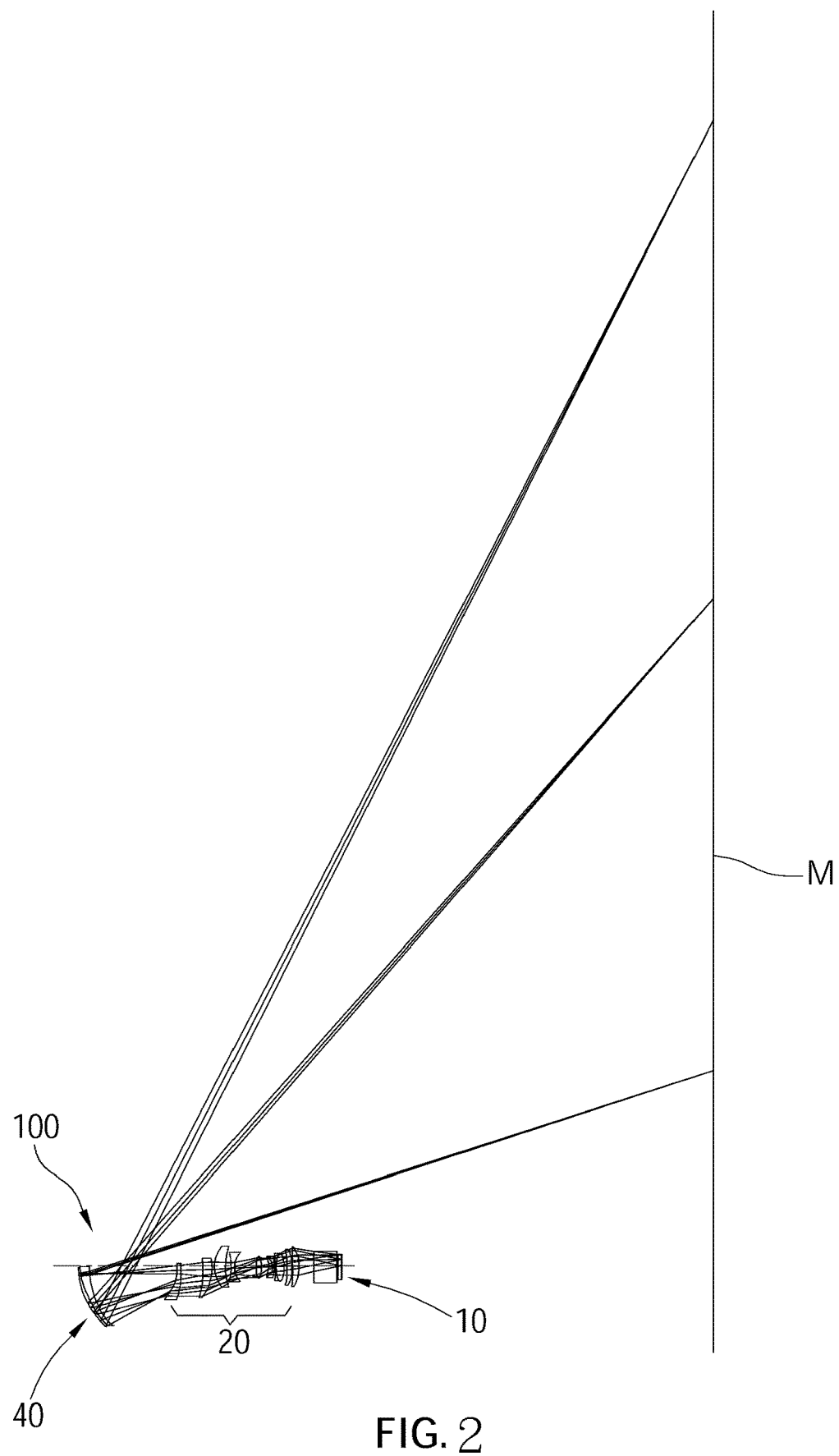
FIG. 2 is a schematic diagram showing the image beam is projected onto the imaging plane through the projecting device of the first embodiment of the present invention.
Figure 3:
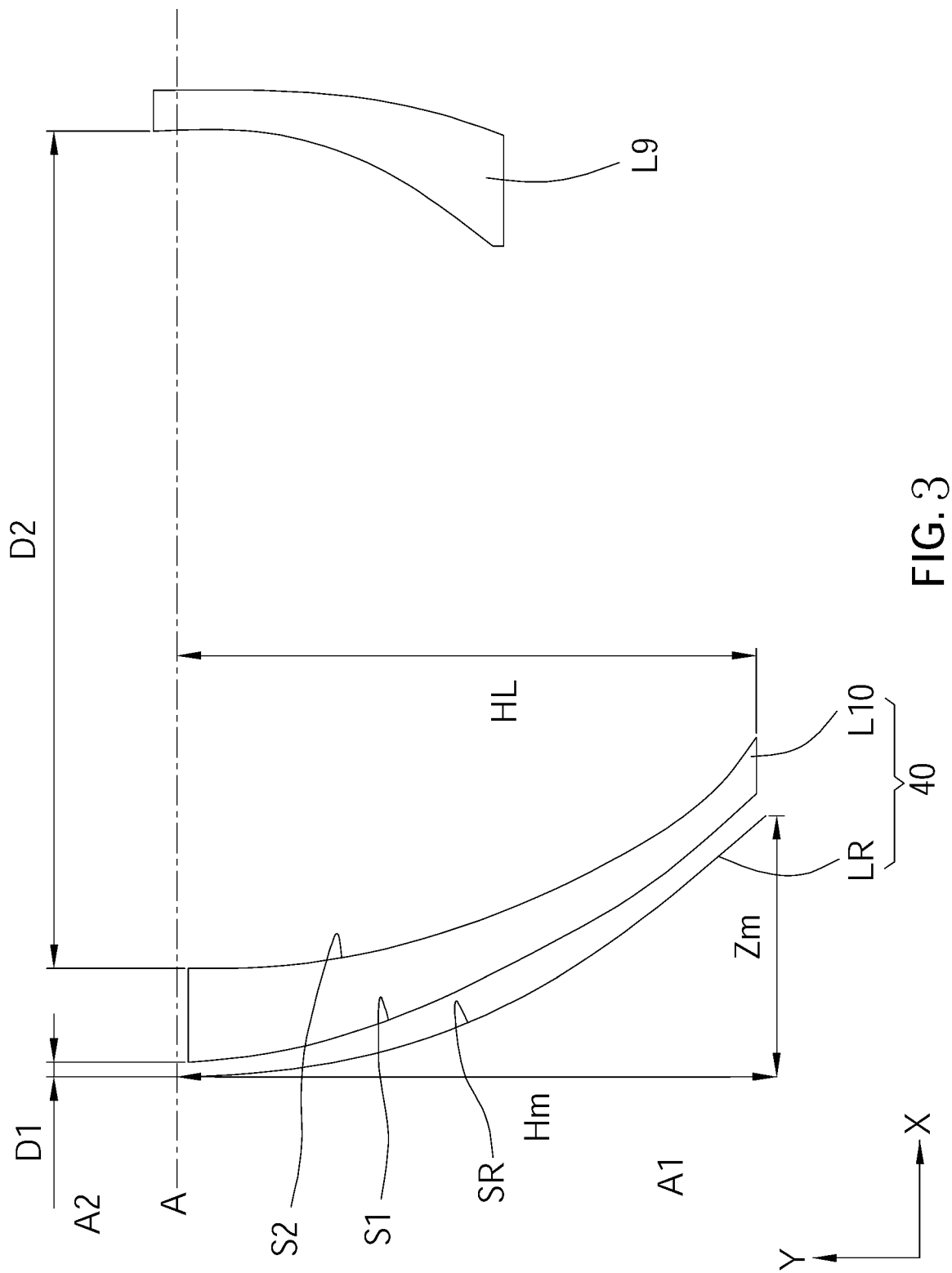
FIG. 3 is a partial enlarged view of FIG. 1.

As shown in FIG. 1 to FIG. 3, a first embodiment of the present invention, a projecting device 100, is provided to receive an image beam P generated by an image light source generating device 10 and then to project the image beam P toward an imaging plane M, and to form a projection picture on the imaging plane M. The projecting device 100 includes an intermediate optical system 20 arranged along an optical axis A, and a reflective optical system 40.

The intermediate optical system 20 is provided to receive the image beam P and for the image beam P to pass. The intermediate optical system 20 is mainly composed of multiple lenses. For example, in this embodiment, the intermediate optical system 20 includes 9 lenses, L1 to L9. Furthermore, an extended surface of the optical axis A is divided into a first portion A1 and a second portion A2. The effective diameter of each of the lenses L1 to L9 of the intermediate optical system 20 is located in the first portion A1 as well as the second portion A2 at the same time, wherein said effective diameter means the area of each of the lenses L1 to L9, where the image beam P passes through and the optical performance changes. Therefore, the intermediate optical system 20 transmits the image beam P according to the designed optical effect. For example, the designed optical effects can be correcting or compensating for chromatic aberration or aberration of its own or caused by some other reason, wherein the aberration may include spherical aberration, coma, astigmation, field curvature, and distortion; additionally, the designed optical effects can be light path adjustment such as focusing and zooming. However, said optical effects may be different design in other embodiments. On the other hand, for other applications, the number and the shape of the lenses of the intermediate optical system 20 can be adjusted or changed according to different optical design or demanded characteristics.

The reflective optical system 40 includes a reflecting component LR and a lens L10. Moreover, in the reflective optical system 40 of this embodiment, only the lens L10 has a refractive power. The lens L10 is located between the reflecting component LR and the intermediate optical system 20, and has a first optical surface S1 and a second optical surface S2, which are opposite to each other, wherein the second optical surface S2 faces the intermediate optical system 20. After the intermediate optical system 20 receives the image beam P, the image beam P enters the lens L10 through the second optical surface S2, and then leaves the lens L10 by the first optical surface S1. Next, the image beam P is reflected by a reflecting surface SR of the reflecting component LR, and enters the lens L10 through the first optical surface S1, leaves the lens L10 by the second optical surface S2, and is finally projected toward the direction of the imaging plane M.

Specifically, in this embodiment, the image beam P enters the reflective optical system 40 through the first portion A1, and after leaving the lens L10 by the second optical surface S2, the image beam P is projected toward the imaging plane M through the second portion A2. Therefore, to make the projecting device 100 thinner without affecting the optical effect, the manufacturer can cut or polish the lens L10 and the reflecting component LR so as to make the effective diameters of the reflecting component LR and the lens L10 located in the first portion A1 rather than extending to the second portion A2.

In addition, if the lens L10 and the reflecting component LR are made of plastic materials, they can be directly formed into the shapes whose effective diameters are located in the first portion A1 by injection or die casting molding instead of secondary processing, i.e., abovementioned cutting or polishing. At the same time, the plastic lens L10 and the reflecting component LR have the advantage of being lightweight.

In addition to achieving the effect of miniaturizing and lightening the projecting device 100, the design that the effective diameters of the reflecting component LR and the lens L10 are located in the first portion A1 rather than extending to the second portion A2 can also greatly reduce the difficulty and precision requirements of the assembly of the projecting device 100, so as to reduce assembly time and increase yield rate during assembly. Furthermore, in consideration of optical design, after passing through the lens L10 located in the first portion A1, the image beam P is then projected toward the direction of the imaging plane M. That is, there is no possibility for the image beam P of passing through the lens L10 located in the second portion A2, which can reduce the loss of energy of the image beam P, caused by passing through different media multiple times. Thus, the projection quality can be increased, and specular reflection caused when the image beam P passes through the lens can be also reduced, so that the interference with optical performance can be thus reduced.

As shown in FIG. 3, in the X-axis direction parallel to the optical axis A, the distance D1 from the reflecting component LR to the lens L10 is shorter than the distance D2 from the lens L10 to the intermediate optical system 20. Moreover, the distance D1 is greater than or equal to 0, which meets the condition of 0 mm≤D1<8 mm. Practically, users can adopt different conditions depending on the application of the projecting device. For example, when the projecting device is a large projecting apparatus, it meets the condition of 0 mm≤D1<8 mm; when the projecting device is a small projecting device, users can adopt the condition of 0 mm≤D1<4 mm; when the projecting device is a miniature projecting device, users can adopt the condition of 0 mm≤D1<1 mm, wherein the distance D1 preferably meets the condition of 0 mm≤D1<0.6 mm, which facilitates the miniaturization of the projecting device. In this embodiment, the reflecting component LR is a reflecting mirror. The distance D1 is the distance on the optical axis from the reflecting component LR to the lens L10, while the distance D2 from the lens L10 to the intermediate optical system 20 is the distance on the optical axis from the lens L10 to the lens L9, wherein the D1=0.537 mm and the D2=32.866 mm. in this way, the design of the projecting device 100 of the present invention is beneficial to lens miniaturization and weight reduction.

In this embodiment, the absolute value of the radius of curvature of the reflecting surface SR of the reflecting component LR is greater than the absolute value of the radius of curvature of the first optical surface S1 of the lens L10. Preferably, the absolute value of the radius of curvature of the first optical surface S1 of the lens L10 is greater than 10 mm and less than 70 mm, while the absolute value of the radius of curvature of the reflecting surface SR of the reflecting component is greater than 10 mm and less than 100 mm. In practice, if at least one of the reflecting surface SR of the reflecting component LR and the first optical surface S1 of the lens L10 is designed to be aspherical, through the design of aspherical parameters, the absolute value of the radius of curvature of the reflecting surface SR of the reflecting component LR can also be less than or equal to the absolute value of the radius of curvature of the first optical surface S1 of the lens L10.

In addition, the height Hm of the reflecting component LR in the Y-axis direction perpendicular to the optical axis A is the first effective height, wherein the first effective height Hm is the height from the optical axis to the maximum effective diameter of the reflecting component. The maximum height of the lens of the intermediate optical system 20 and the lens of the reflective optical system 40 in the direction perpendicular to the optical axis A is a second effective height HL, wherein the second effective height HL is the height from the optical axis to the maximum effective diameter of the lens of the intermediate optical system 20 and the lens of the reflective optical system 40. The second effective height HL is 0.7 times to 1.1 times the first effective height Hm. In this embodiment, the first effective height Hm of the reflecting component LR perpendicular to the optical axis is 21.5 mm. The lens L10 of the reflective optical system 40 has the maximum height among the lens of the intermediate optical system 20 and the lens of the reflective optical system 40 in the direction perpendicular to the optical axis A, wherein the second effective height HL is 21.14 mm. The second effective height HL is 0.98 times the first effective height Hm. In this way, the design of the projecting device 100 is beneficial to lens miniaturization and weight reduction.

In the direction of the Y-axis perpendicular to the optical axis, the height of the reflecting component LR is Hm; in the direction of the X-axis parallel to the optical axis, the length of the reflecting component LR is Zm, wherein Zm/Hm<0.6, which preferably meets the condition of Zm/Hm<0.5. In this embodiment, Zm=10.08 mm, Hm=21.5 mm, and Zm/Hm=0.468 mm. Thus, the reflecting component LR meets the condition of Zm/Hm<0.6. Furthermore, the design that the radius of curvature of the reflecting surface SR of the reflecting component LR is greater than the radius of curvature of the first optical surface S1 of the lens will be conducive to the processing of the reflecting component LR, and improve the manufacturing accuracy of the reflecting surface SR, as well as reduce the sensitivity of the projecting device 100 during assembly, and also suppress aberration changes, so as to obtain better projection image performance.

In this embodiment, the reflective optical system 40 only includes the lens L10 and the reflecting component LR. In this way, aside from lowering the number of the lens of the reflective optical system 40, which reduces the cost, unnecessary light reflection between lenses can also be reduced so as to improve imaging quality. In other applications, the reflective optical system 40 can further include other optical elements without refractive power such as filters, and is not limited to the abovementioned optical elements.

Figure 4:
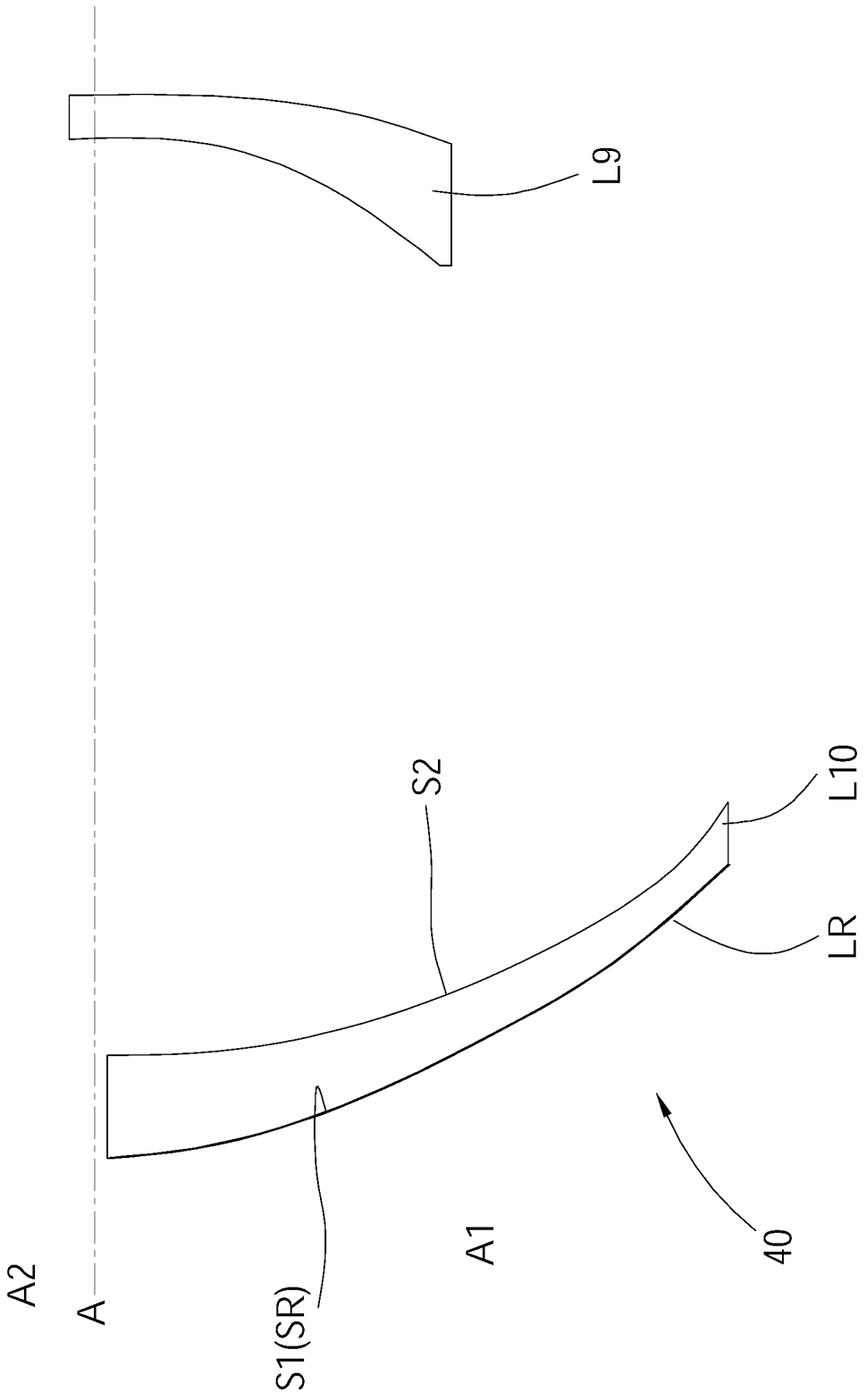
FIG. 4 is a schematic diagram of the projecting device of the second embodiment of the present invention.

Moreover, as shown in FIG. 4, a second embodiment is similar to the first embodiment, while the difference is that the distance D1 between the reflecting component LR and the lens L10 is 0 mm. More specifically, the reflecting component LR is a metal reflective film on the first optical surface S1 of the lens L10 so that the distance D1 form the reflecting component LR to the lens L10 is 0 mm, which makes the reflecting surface SR of the reflecting component LR coplanar with the first optical surface S1. That is, the absolute value of the radius of curvature of the reflecting surface SR of the reflecting component LR is equal to the absolute value of the radius of curvature of the first optical surface S1 of the lens L10. Therefore, the number of times that light passes through different media will be reduced, which reduces the loss of light energy so as to provide projection quality. Additionally, in other applications, the reflective film can be made of other materials and is not limited to be metal. For example, the reflective film can also be formed by dielectric film or ceramic coating.

Figure 5:
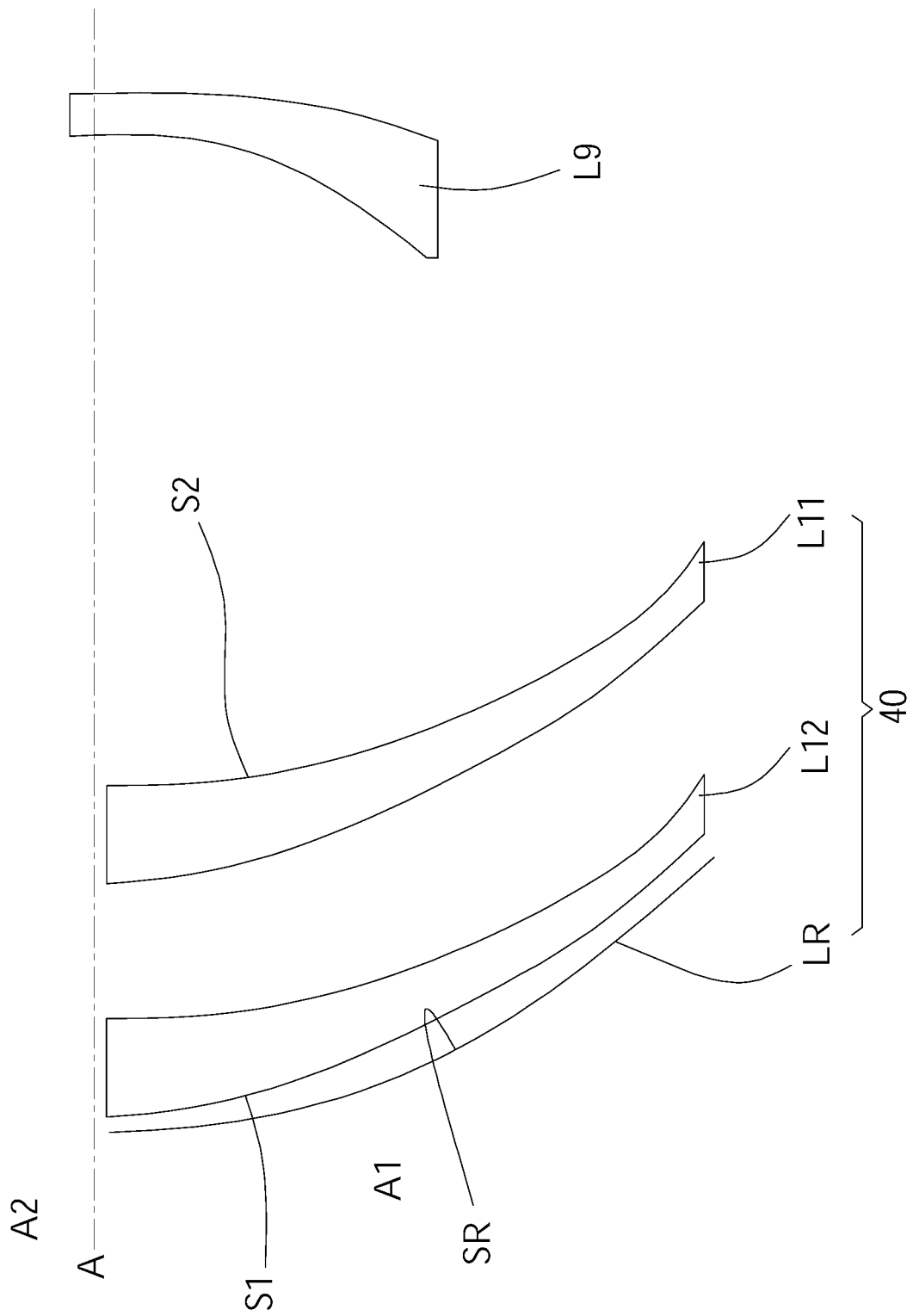
FIG. 5 is a schematic diagram of the projecting device of the third embodiment of the present invention.

Furthermore, as illustrated in FIG. 5, a third embodiment is similar to the first embodiment, while the difference is that the reflective optical system 40 includes a lens L11 and a lens L12, wherein the lens L11 has the second optical surface S2, and the lens L12 has the first optical surface S1. The image beam P enters the lens L11 through the second optical surface S2, and goes to the reflecting surface SR of the reflecting component LR through the first optical surface S1. Then, the image beam P is reflected by the reflecting surface SR and passes through the lens L12 and the lens L11, and leaves the lens L11 from the second optical surface S2, and is finally projected toward the direction of the imaging plane M. Similarly, the shapes of said two lenses are designed that the effective diameters of them are located in the first portion A1 rather than extending to the second portion A2. In this way, with the refractive power of the two lens of the reflecting component LR of the reflective optical system 40 in this embodiment, the radius of curvature of the reflecting surface SR can be increased, or the length of the reflecting component LR, Zm, can be shortened without affecting optical performance, which facilitates the processing of the reflecting component LR, and effectively ensures the manufacturing accuracy of the reflecting surface SR, as well as reduces the sensitivity of the projecting device during assembly, and also suppresses aberration changes.

It must be noted that the embodiments described above are only preferred embodiments of the present invention. All equivalent structures which employ the concepts disclosed in this specification and the appended claims should fall within the scope of the present invention.

What is claimed is:

1. A projecting device for receiving an image beam generated by an image light source generating device and then projecting the image beam toward a direction of an imaging plane, wherein the projecting device comprises:

an intermediate optical system arranged along an optical axis and a reflective optical system; the intermediate optical system is provided to receive the image beam and for the image beam (P) to pass;

the reflective optical system comprises a reflecting component and at least one lens, wherein the at least one lens is located between the reflecting component and the intermediate optical system, and has a first optical surface and a second optical surface, which are opposite to each other; the second optical surface faces the intermediate optical system;

wherein, after the image beam passing through the intermediate optical system, the image beam enters the at least one lens through the second optical surface, and enters a reflecting surface of the reflecting component through the first optical surface; then, after being reflected by the reflecting surface, the image beam passes through the at least one lens, and leaves the at least one lens from the second optical surface, and is finally projected toward the direction of the imaging plane;

wherein, in a direction parallel to the optical axis, a distance from the reflecting component to the at least one lens on the optical axis is less than a distance from the at least one lens to the intermediate optical system on the optical axis; the distance from the reflecting component to the at least one lens on the optical axis is greater than or equal to 0;

wherein, an extended surface of the optical axis is divided into a first portion and a second portion; the image beam enters the reflective optical system through the first portion, and after the image beam leaves the at least one lens from the second optical surface, the image beam is projected toward the direction of the imaging plane through the second portion; in addition, effective diameters of the intermediate optical system are located in the first portion and the second portion at the same time, while effective diameters of the reflecting component and the at least one lens are located in the first portion rather than extending to the second portion; and wherein in the direction parallel to the optical axis, the distance from the reflecting component to the at least one lens is D1, which meets the condition of $0 \text{ mm} \leq D1 < 8 \text{ mm}$.

2. The projecting device of claim 1, wherein the distance from the reflecting component to the at least one lens on the optical axis is equal to 0.

3. The projecting device of claim 1, wherein the reflecting surface of the reflecting component stays closely to or is coated on the first optical surface of the at least one lens.

4. The projecting device of claim 1, wherein the intermediate optical system comprises a plurality of lenses; a height of the reflecting component in a direction perpendicular to the optical axis is a first effective height; a maximum height of the lens of the intermediate optical system and the at least one lens of the reflective optical system in the direction perpendicular to the optical axis is a second effective height, wherein the second effective height is 0.7 times to 1.1 times the first effective height.

5. The projecting device of claim 1, wherein a height of the reflecting component in a direction perpendicular to the optical axis is a first effective height; a height of the at least one lens of the reflective optical system in the direction perpendicular to the optical axis is a second effective height, wherein the second effective height is 0.7 times to 1.1 times the first effective height.

6. The projecting device of claim 1, wherein the number of the at least one lens is one, and the reflective optical system is composed of the reflecting component and the lens.

7. The projecting device of claim 1, wherein an absolute value of radius of curvature of the reflecting surface of the reflecting component is greater than or equal to an absolute value of radius of curvature of the first optical surface of the at least one lens.

8. The projecting device of claim 1, wherein at least one of the reflecting surface of the reflecting component and the first optical surface of the at least one lens is aspherical; an absolute value of radius of curvature of the reflecting surface of the reflecting component is less than or equal to an absolute value of radius of curvature of the first optical surface of the at least one lens.

9. The projecting device of claim 1, wherein the distance from the reflecting component to the at least one lens on the optical axis is greater than 0, and an absolute value of radius of curvature of the first optical surface of the at least one lens is greater than 10 mm and less than 70 mm.

10. The projecting device of claim 1, wherein the distance from the reflecting component to the at least one lens on the optical axis is greater than 0, and an absolute value of radius of curvature of the reflecting surface of the reflecting component is greater than 10 mm and less than 100 mm.

11. The projecting device of claim 1, wherein a height of the reflecting component in a direction perpendicular to the optical axis is Hm; a length of the reflecting component in a direction parallel to the optical axis is Zm, wherein Zm/Hm<0.6.

12. The projecting device of claim 11, wherein Zm/Hm<0.5.

* * * * *